US008122249B2

(12) United States Patent
Falk et al.

(10) Patent No.: US 8,122,249 B2
(45) Date of Patent: Feb. 21, 2012

(54) METHOD AND ARRANGEMENT FOR PROVIDING A WIRELESS MESH NETWORK

(75) Inventors: Rainer Falk, Erding (DE); Florian Kohlmayer, Starnberg (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 572 days.

(21) Appl. No.: 12/087,620

(22) PCT Filed: Aug. 1, 2007

(86) PCT No.: PCT/EP2007/057936
§ 371 (c)(1),
(2), (4) Date: Jul. 10, 2008

(87) PCT Pub. No.: WO2008/019943
PCT Pub. Date: Feb. 21, 2008

(65) Prior Publication Data
US 2009/0172398 A1 Jul. 2, 2009

(30) Foreign Application Priority Data
Aug. 17, 2006 (DE) .................... 10 2006 038 591

(51) Int. Cl.
H04W 12/06 (2009.01)
(52) U.S. Cl. ...................................... 713/168
(58) Field of Classification Search .................. 713/168
See application file for complete search history.

(56) References Cited

U.S. PATENT DOCUMENTS

| 7,272,129 B2* | 9/2007 | Calcev et al. ............... 370/338 |
| 7,561,692 B2* | 7/2009 | Altshuller et al. ............ 380/247 |
| 2003/0226017 A1* | 12/2003 | Palekar et al. ............... 713/168 |
| 2005/0152305 A1 | 7/2005 | Ji et al. |
| 2006/0179310 A1* | 8/2006 | Zhang .......................... 713/168 |
| 2007/0206537 A1* | 9/2007 | Cam-Winget et al. ........ 370/331 |
| 2008/0108322 A1* | 5/2008 | Upp ............................. 455/411 |
| 2009/0086973 A1* | 4/2009 | Buddhikot et al. ........... 380/273 |
| 2009/0307483 A1* | 12/2009 | Falk et al. .................... 713/153 |
| 2011/0264915 A1* | 10/2011 | Cam-Winget et al. ........ 713/171 |

FOREIGN PATENT DOCUMENTS
WO    WO 03094438 A1    11/2003

OTHER PUBLICATIONS

IEEE 802.1X-2004: "IEEE Standard for Local and Metropolitan Area Networks—Port-Based Network Access Control"; Dec. 13, 2004; pp. 37-40; New York; ISBN 0-7381-4528-8.

(Continued)

*Primary Examiner* — Eleni Shiferaw
*Assistant Examiner* — Tamara Teslovich (57) ABSTRACT

Provided are a method and an arrangement for creating a wireless mesh network in which a new node is provided that is connected between mesh nodes and an AAA server located in an infrastructure network. Based on basic encoding data that is available to the new node following successful initial authentication of a first mesh node, the new node performs the authentication similar to a proxy server instead of an AAA server, particularly for a limited time, during subsequent authentication attempts.

25 Claims, 11 Drawing Sheets

OTHER PUBLICATIONS

IEEE 802.11i-2004: "IEEE Standard for Information technology—Telecommunications and information exchange between systems—Local and metropolitan area networks—Specific requirements; Part II: Wireless LAN Medium Access Control (MAC) and Physical Layer (PHY) specifications; Amendment 6: Medium Access Control (MAC) Security Enhancements"; Jul. 23, 2004; pp. 13-15, 19-20; New York; ISBN 0-7381-4073-2.

Faccin et al.; "Mesh WLAN Networks: Concept and System Design"; IEEE Wireless Communications; Apr. 2006, pp. 10-17; vol. 13, Issue 2.

Chen et al.; "Wireless LAN Security and IEEE 802.11i"; IEEE Wireless Communications, Feb. 2005, pp. 27-36; vol. 12, Issue 1.

Yang et al.; "An Improved Security Scheme in WMAN Based on IEEE Standard 802.16"; Proceedings, International Conference on Wireless Communications, Networking and Mobile Computing, Sep. 2005, pp. 1191-1194; vol. 2, 23.-26.

Agre J. et al.: Secure NOmadic Wireless Mesh (SnowMesh) 802.11 TGs ESS Mesh Networking Proposal, Internet Citation, (online), May 2005, XP00790220, Internet: URL:http://www.flacp.lfujitsulabs.com/snowmesh.pdf.

\* cited by examiner

METHOD AND ARRANGEMENT FOR PROVIDING A WIRELESS MESH NETWORK

CROSS REFERENCE TO RELATED APPLICATIONS

This application is the US National Stage of International Application No. PCT/EP2007/057936, filed Aug. 1, 2007 and claims the benefit thereof. The International Application claims the benefits of German application No. 10 2006 038 591.8 DE filed Aug. 17, 2006, both of the applications are incorporated by reference herein in their entirety.

FIELD OF INVENTION

The invention relates to a method for providing a wireless mesh network and to an arrangement for providing a wireless mesh network.

The invention relates to a method and a system for providing a key for encrypting messages between nodes of a mesh network.

BACKGROUND OF INVENTION

A wireless mesh network is a meshed network that is implemented for example in a wireless local area network (WLAN). In a mesh network, a mobile node can forward data originating from another mobile node to a further mobile node or to a base station. Long distances can be spanned in a mesh network, in particular in uneven or difficult terrain. Furthermore, mesh networks operate very reliably, since every mobile node is connected to a number of other nodes. If one node fails, due to a hardware fault for example, its neighboring nodes look for an alternate data transmission route. Mesh networks can also include fixed (stationary) or mobile devices.

Figure 1:
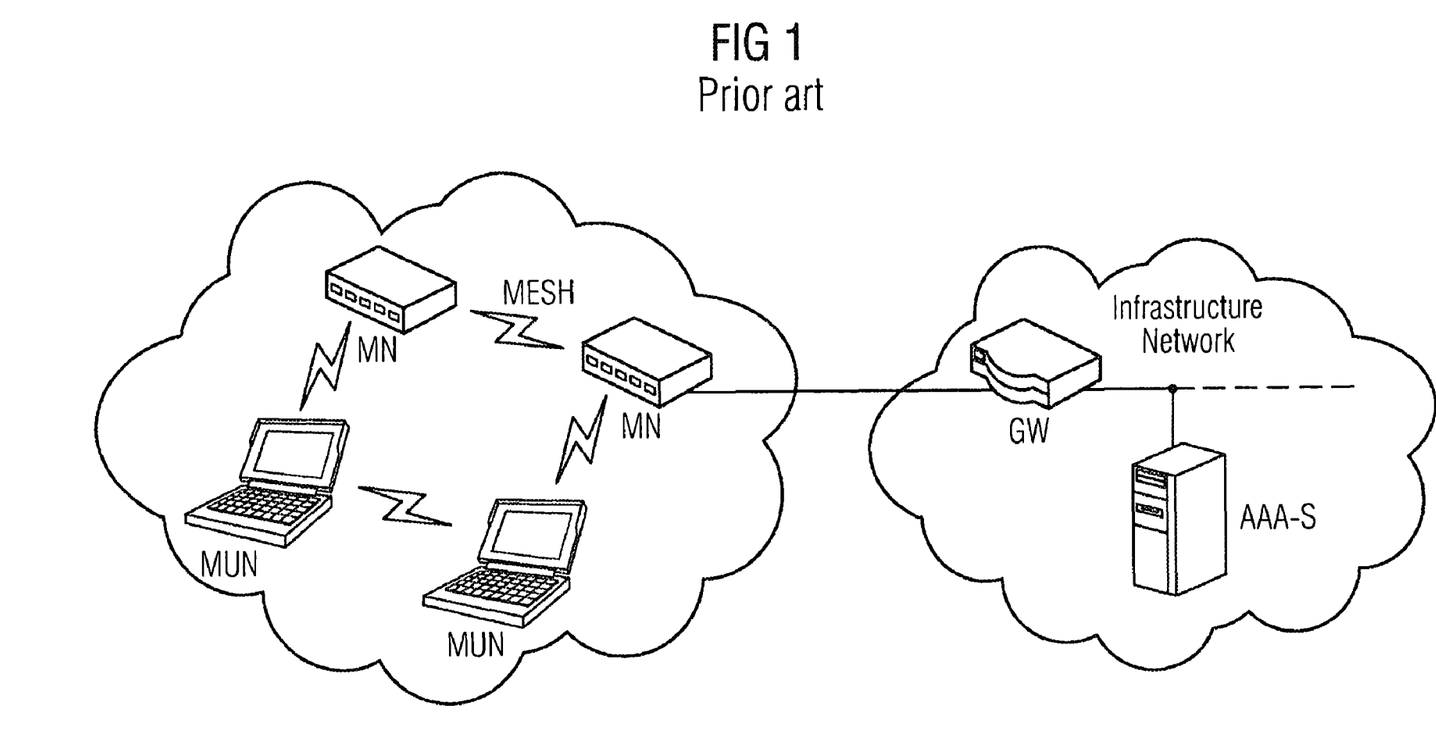
FIG. 1 shows a mesh network scenario.

FIG. 1 shows a mesh network according to the prior art in schematic form. The nodes comprise dedicated mesh nodes (MN) which belong to the infrastructure of the network. Said dedicated mesh nodes can be a fixed base station BS or a mobile station MS. In addition to the dedicated mesh nodes, the mesh network also includes mobile terminal devices or, as the case may be, mobile nodes of users. The mobile nodes can communicate directly with other mobile nodes and directly or indirectly exchange data via further nodes with a base station BS that is connected to a gateway GW of a data network. In this case data packets DP are forwarded from one device or node to the next device until the destination device or gateway GW is reached, the data packets DP being forwarded by means of dynamic routing. In this case the routes over which the data packets DP are transferred are calculated dynamically based on the availability of the nodes and based on the network utilization. In general, mesh networks are characterized by a high level of network coverage, high reliability and economical use of available resources. In wireless mesh networks, the wireless transmission link is traditionally implemented by means of a WLAN (Wireless Local Area Network) transmission link. In contrast to a wireless personal area network (WPAN), WLAN networks have greater transmit powers and ranges and offer higher data transfer rates.

Figure 2:
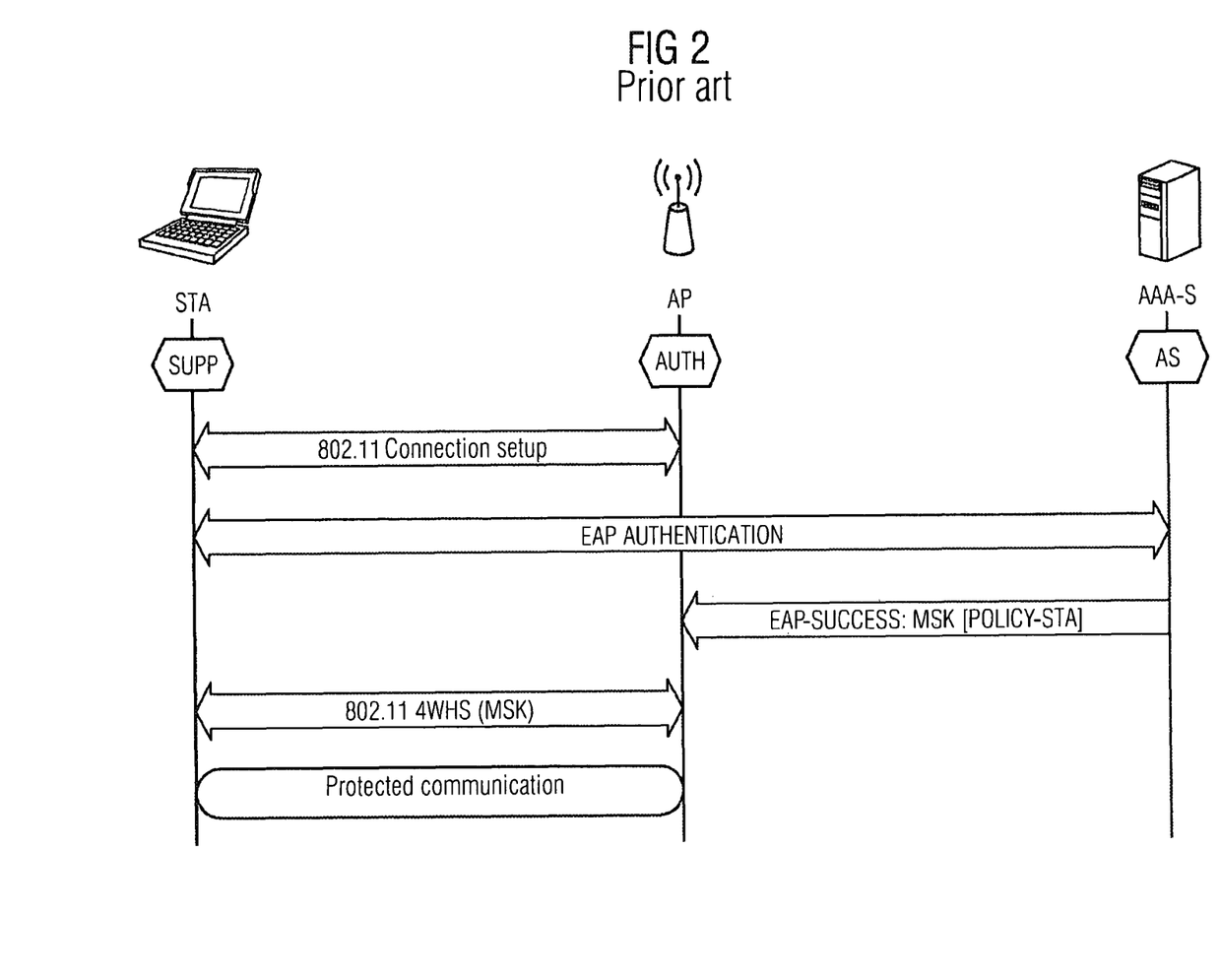
FIG. 2 shows a flow diagram of a mesh authentication in accordance with Draft D0.01 IEEE802.11s.

In order to authenticate nodes or computers, use is made of what is termed the Extensible Authentication Protocol (EAP) which is known for example from IEEE 802.X-2004: "IEEE standard for local and metropolitan area networks—Port-based network access control", ISBN 0-7381-4528-8, Dec. 13, 2004, pp. 37-40. FIG. 2 shows a signal diagram to illustrate an authentication process in a conventional WLAN network. The EAP protocol is used in the case of WLANs for safeguarding access to the network. A wide variety of actual authentication procedures, known as EAP methods, can be transported via the EAP protocol, e.g. EAP-TLS, EAP-AKA, PEAP-MSChapv2. During the authentication a cryptographic key or session key MSK, EMSK (MSK: Master Session Key; EMSK: Extended Master Session Key) is determined which is subsequently used to protect the data communication, for example in the case of Link Layer encryption. The authentication of a subscriber takes place between the subscriber (supplicant) and an authentication server (AAA server). Upon successful authentication, the authentication server sends the result of the authentication and the session key MSK originating from the authentication to the authenticator, a WLAN access point AP for example. The communication between the access node or access point AP and the authentication server usually takes place by way of the Radius or Diameter data transmission protocol, the session key MSK being sent as a data attribute to the access node AP as part of an EAP success message. The transmitted session key MSK is subsequently used in an 802.11 4-way handshake 802.11 4WHS between the supplicant and the access node conforming to the 802.11 IEEE standard.

In a conventional network, the access node AP is a trusted node, i.e. a node belonging to the network infrastructure. The access node in a conventional network is therefore not an end user node.

Figure 3:
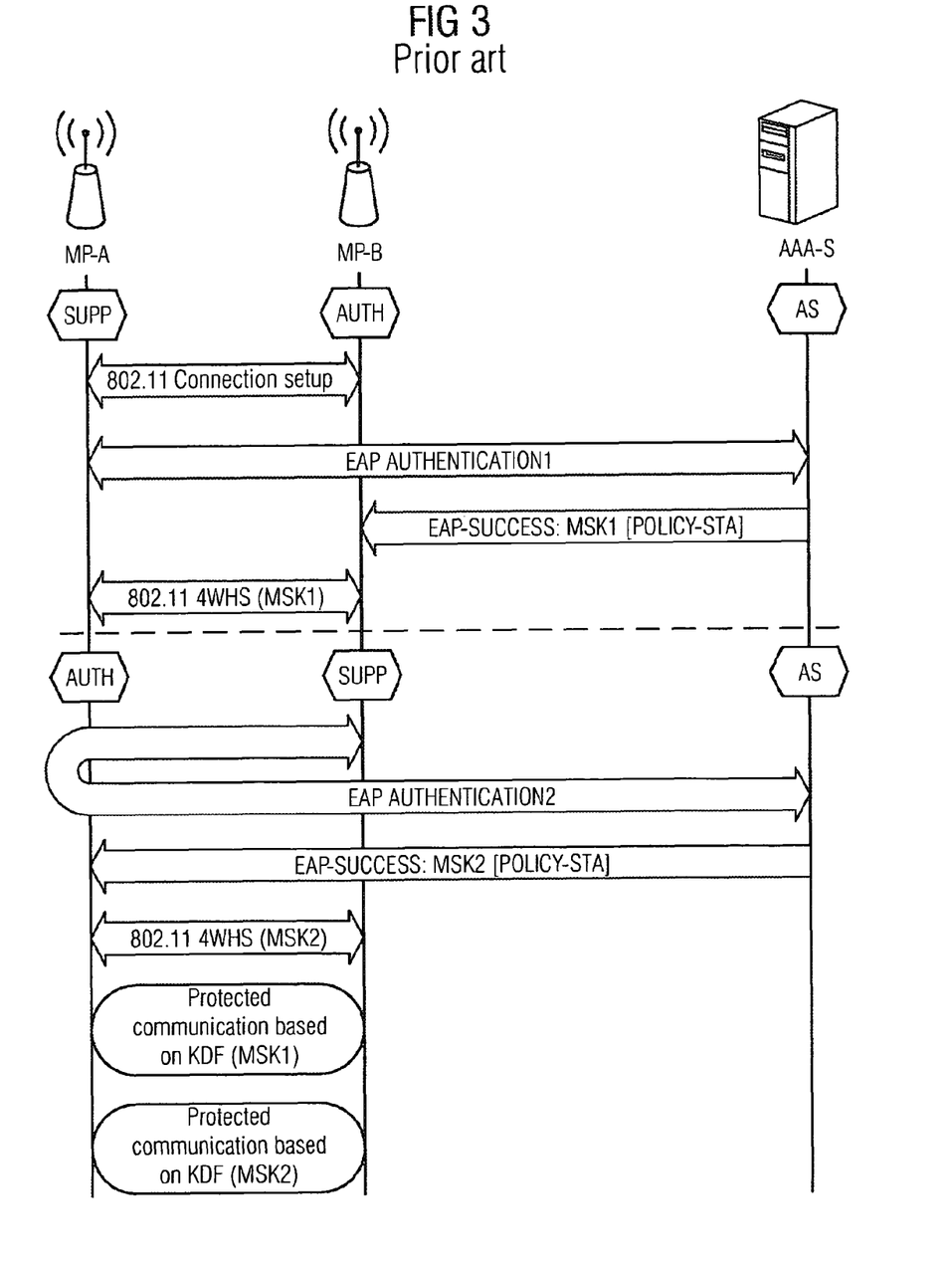
FIG. 3 shows a flow diagram of a WLAN authentication according to the prior art.

FIG. 3 shows the authentication of two nodes MP-A, MP-B in a conventional WLAN network. The two nodes MP-A, MP-B can be, for example, two mesh nodes of a mesh network. In order to set up a data connection between the two nodes MP-A, MP-B, the end node MP-A (as supplicant) first authenticates itself with the associated authentication server AS by means of the EAP data transmission protocol. The node MP-B (authenticator) receives a session key MSK1 in an EAP success message. The node MP-B then performs a 4-way handshake with the node MP-A and in the process uses the received session key MSK1. The node MP-B (now as supplicant) then performs an authentication at the associated authentication server AS, and MP-A (now as authenticator) receives a second session key MSK2 in an EAP success message. The node MP-A then performs a 4-way handshake with the node MP-B using the second session key MSK2. Instead of being performed sequentially, the two authentications can also be interleaved or nested one inside the other.

The further communication between the two nodes MP-A, MP-B can be protected by means of one of the two session keys MSK1, MSK2.

A disadvantage of the prior art approach illustrated in FIG. 3 is that the nodes MP-A, MP-B may be mesh nodes which are not part of the network access infrastructure and consequently are vulnerable to manipulation. Since a mesh node communicates with neighboring mesh nodes, multiple authentications of a mesh node are necessary. This leads to a high load being imposed on the authentication server and a high signaling overhead for the transmission of authentication messages to the authentication server in the infrastructure network.

An enhancement of the EAP authentication method for the IEEE 802.11 standard is known from IEEE 802.11i-2004: "IEEE standard for local and metropolitan area networks—Wireless LAN Medium Access Control—Security Enhancements", ISBN 0-7381-4073-2, Jul. 23, 2004, pp. 13-15, 19-20.

A WLAN mesh network is known, for example, from Faccin, S. M. et al: "Mesh WLAN networks: concept and system design", Wireless Communications, IEEE, Volume 13, Issue 2, April 2006, pp. 10-17, wherein the network elements mutually authenticate one another.

An extension of the authentication method known from IEEE 802.11 can be found in Jyh-Cheng, C. et al: "Wireless LAN security and IEEE 802.11i." Wireless Communications, IEEE, Volume 12, Issue 1, February 2005, pp. 27-36, while an extension of the authentication method known from IEEE 802.16 is described in Fan, Y. et al: "An improved security scheme in WMAN based on IEEE standard 802.16", Proceedings, International Conference on Wireless Communications, Networking and Mobile Computing, Volume 2, Sep. 23-26, 2005, pp. 1191-1194.

US 2005/01 52 305 A1 discloses an authentication method in a WLAN network using an EAP proxy.

SUMMARY OF INVENTION

The object underlying the present invention is therefore to disclose an improved method and arrangement for providing a wireless mesh network.

This object is achieved proceeding by the independent claims.

With the inventive method for providing a wireless local area network in which stationary communication devices and mobile communication devices embodied according to the IEEE 802.11 standard and its derivatives, in particular IEEE 802.15 or IEEE 802.16, are connected as a subnetwork in the manner of the mesh, and which is connected to an infrastructure network in such a way that it can exchange authentication messages with an "Authentication Authorization Accounting" (AAA) server disposed in the infrastructure network using the Extensible Authentication Protocol EAP via a station assigned to the subnetwork, following successful first-time authentication of a first communication device of the subnetwork with specification of first identity information vis-à-vis a communication device of the subnetwork fulfilling a role, defined in accordance with the EAP protocol, of an authenticator for the authentication of the first communication device, the AAA server generates, precisely once within a first validity period, basic encryption information that is valid for the subnetwork, wherein the basic encryption information is transmitted to a station that is uniquely assignable to the subnetwork, and wherein the station stores at least the basic encryption information and assigns it to the identity information specified by the first communication device, and wherein the station handles authentication attempts following the first-time authentication on the part of the first communication device vis-à-vis a second communication device of the subnetwork with specification of second identity information in the manner of a proxy server while omitting the AAA server on the basis of the basic encryption information determined by the specified second identity information using the Extensible Authentication Protocol EAP and provides the second communication device with a key determined for the second communication device using the stored basic encryption information for the purpose of cryptographically secure communication with the first communication device.

The advantages resulting from the method according to the invention consist firstly in the fact that an infrastructure server AAA-Server has to bear a smaller load than would be the case according to the prior art. This is a result of the fact that basically it must handle only the first registration of the first communication device and subsequent registrations of the first communication device are handled with the aid of the station. Secondly, the signaling overhead within the infrastructure network for transmitting the required EAP registration messages is reduced. Furthermore, registrations following the initial registration can be performed considerably faster, since the messages are transferred to the station more quickly than to an infrastructure AAA server that is often located a great distance away. In addition, the overhead is restricted to the first communication device in each case, since it is irrelevant to the communication device fulfilling the authenticator role whether the authentication is a first or a subsequent authentication.

In an advantageous development, the basic encryption information includes as information at least one encryption key by means of which a secure authentication can be performed and hence a cryptographic key is provided which can be used for protected communication between two mesh communication devices. Said key that is provided is preferably generated dynamically as a session key in the course of the secure authentication as a session key. This means that different key material is provided for the protection of a link to each neighboring communication device.

If the encryption key is stored by the station as a key assigned to the first communication device, it is ensured that each first communication device has a key according to the invention.

Said stored key is preferably used for handling the authentication attempts. In particular one of the EAP methods EAP PSK, EAP TLS with TLS-PSK (TLS using a pre-shared key) or EAP AKA can be used.

If the station stores a key which is derived from the encryption key and assigned to the first communication device, the encryption key will not be used for different purposes, but instead the derived key can be used for example for further authentications of the first communication device, thereby affording additional security.

It is also advantageous if the AAA server derives a key from the encryption key and transmits it as a key assigned to the first communication device in the course of the first-time authentication as part of the encryption information.

It is also advantageous that the assigned key is transmitted with a message embodied as an EAP success message according to the EAP protocol. This has the advantage that the inventive method can be introduced into existing systems without major modification, since the second communication device in each case receives the key as is already known in the prior art.

If the derivation is performed in such a way that the assigned key is generated using a key derivation function on the basis of a master session key MSK formed according to the EAP protocol, an easier implementation of the method according to the invention is likewise possible, as is also the case when the derivation is performed such that the assigned key is generated using a key derivation function on the basis of an extended master session key EMSK formed according to the EAP protocol, since both are encryption keys used in IEEE 802.11 and its derivatives.

If the derivation is performed by the AAA server, this has the advantage that both MSK and EMSK keys can be used.

If the key is derived from an EMSK key, it is advantageous if the key derived from the EMSK is also transmitted to the station on the part of the AAA server in addition to the MSK.

If the key is derived by the station, the AAA server does not have to be expanded in order to perform this key derivation.

If a function according to a cryptographic hash function, in particular SHA-1, SHA-256 or MD5, is used as the key derivation function of the assigned encryption key, a cryptographic separation is ensured, thereby avoiding a single key being used for different purposes.

If, on the other hand, the key derivation function of the assigned encryption key is based on what are known as keyed hash functions, in particular HMAC according to RFC2104, this has the advantage that it is still possible to incorporate into the key derivation a character string which, for example, indicates the intended purpose of the derived key.

A very practicable development is provided in this case as a result of the fact that the assigned encryption key is formed according to a key derivation function which is produced from the formula $$M\text{-}AAA\text{-}Key = HMAC\text{-}SHA\text{-}1\ (MSK,\ \text{"Mesh AAA Key"}),$$

where the thus derived key is denoted by "M-AAA-KEY", the keyed hash function HMAC using the hash function "SHA-1" is denoted by "HMAC-SHA-1", and where "MSK" denotes the master session key determined according to the EAP protocol and "Mesh AAA Key" denotes an arbitrary character string which in particular expresses the intended purpose of the key.

It is also advantageous that the assigned key is identical to the master session key MSK or the extended master session key EMSK formed according to the EAP protocol, since this represents a variant with negligible computing overhead.

If the first validity period corresponds to the period of validity of a master session key and/or extended master session key formed according to the EAP protocol, then the validity of the subsequent authentication is not longer than that of the first authentications, but the period of validity of the key of the first authentication also applies to the subsequent authentications, with the result that the absolute end time is the same, whereas a second validity period which determines the period of validity of the assigned key and corresponds to the period of validity of a master session key formed according to the EAP protocol results in the relative period of validity measured from the time of authentication being the same.

Alternatively, a second validity period determining a period of validity of the assigned key is determined by a specified number of allowed authentications, thus making it possible to limit the number of authentications.

It constitutes a particularly suitable development if a converter (gateway) connecting the subnetwork to the infrastructure network is used as the station.

If parameters determining network attributes, in particular what is termed a policy, such as, for example, the maximum bandwidth, QoS reservations, the period of validity, user-related account information, and/or traffic filtering rules, are attached to the encryption information, then said information is also provided for the subsequent authentications of the respective authenticator communication device.

It appears particularly suitable if the authentications following the first authentications are performed according to the EAP-PSK method specified in accordance with the EAP protocol. This has the advantage that with the aid of the method used, the station determines that it will perform said authentication for a current authentication attempt in the manner of a proxy server while omitting communication with the AAA server.

This is of advantage in particular when the handling in the manner of a proxy server takes place in such a way that after the first-time authentication has been completed, the AAA server is omitted by terminating messages formed in accordance with the EAP protocol in the station, the terminating being performed based on information correlating with the messages. In this way a simple method is made available by means of which the method according to the invention is implemented, with the result that authentication attempts taking place according to the inventive method can be terminated at the station, whereas first authentication attempts and other messages can be forwarded to the AAA server, as is known from the prior art.

A very simple implementation without entailing major effort to change existing systems is given when the type of EAP protocol method used is detected as the correlating information. Alternatively to this, it is advantageous if the "Network Access Identifier" NAI, which has in particular a structure of the form user@realm, where "user" designates the message-sending station and "realm" the domain provided in particular by the AAA server, is manipulated as correlating information in such a way that the station is yielded as addressee from the information correlating with the messages. In this way an addressing format customary in EAP systems is also used in a consistent manner for the invention. In this case a character string identifying the station is preferably added and that the NAI has in particular the form "{mesh-aaa}user@realm", "user{mesh-aaa}@realm" or "user@{mesh-aaa}.realm"; this advantageously results in the station being uniquely identified and addressed. A further advantageous alternative is given when the identification of the station is set as the manipulation of the domain identification and has in particular the form "user@mesh-aaa".

If, after the validity period has expired, further authentications are only successful following a new, first-time authentication with the AAA server performed in particular before expiry of the validity period, the validity of the first authentication and the subsequent authentications based thereon is limited, with the result that security is increased because a new authentication process conferring security has to be started.

Alternatively or in addition it is advantageous that the basic encryption information includes as information at least one AKA authentication vector in the manner of that formed according to RFC4187 Section 1, a master session key formed in accordance with the EAP protocol preferably being set as a secret key necessary in the manner of the AKA for the forming of the AKA encryption vector.

BRIEF DESCRIPTION OF THE DRAWINGS

Further details and advantages of the invention are to be explained in more detail based on the prior art represented in FIGS. 1 to 3 with reference to exemplary embodiments shown in FIGS. 4 to 7.

DETAILED DESCRIPTION OF INVENTION

Based on the scenario depicted in FIGS. 1 to 3, the method according to the invention will be explained in more detail in the following figures with reference to exemplary embodiments, identical units and method steps receiving the same designation in the respective figures.

Figure 4:
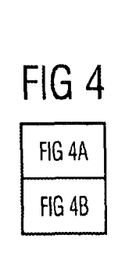
FIG. 4 shows a flow diagram of an initial mesh registration according to an exemplary embodiment of the invention.
Figure 4A:
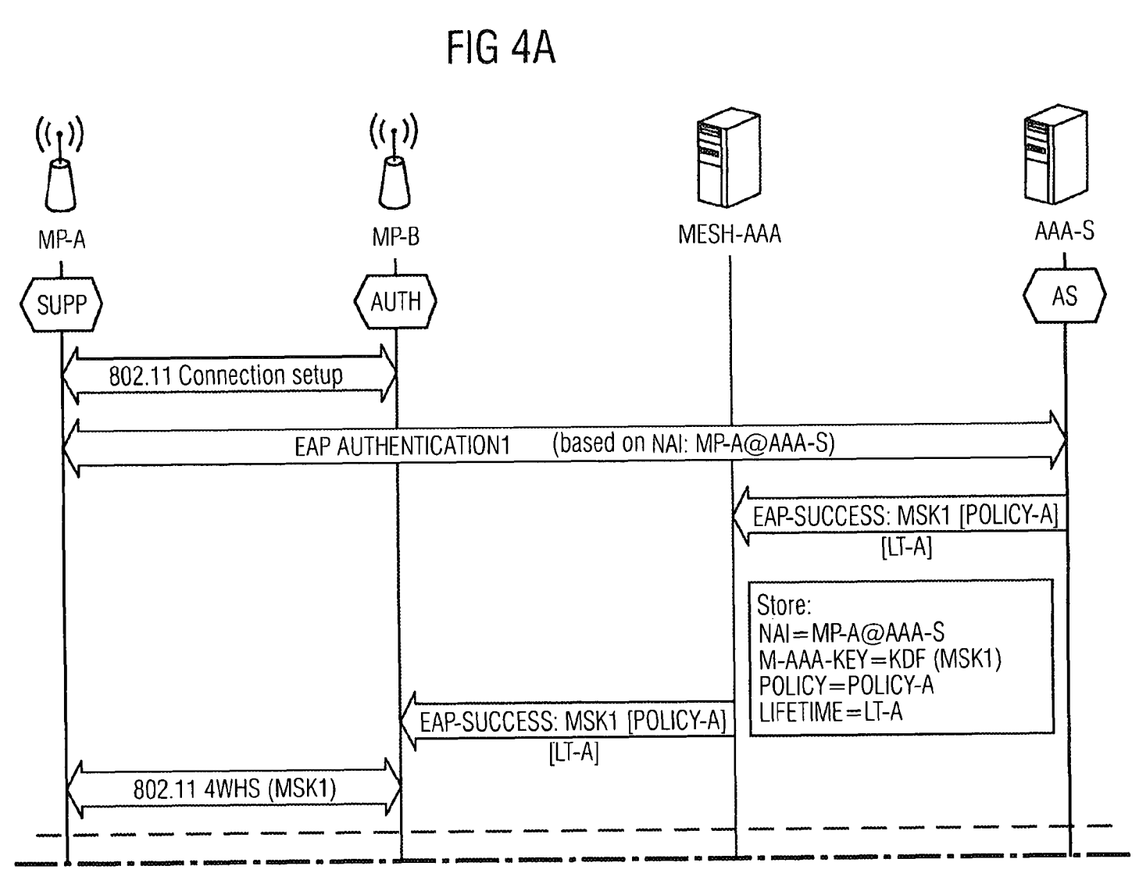
Figure 4B:
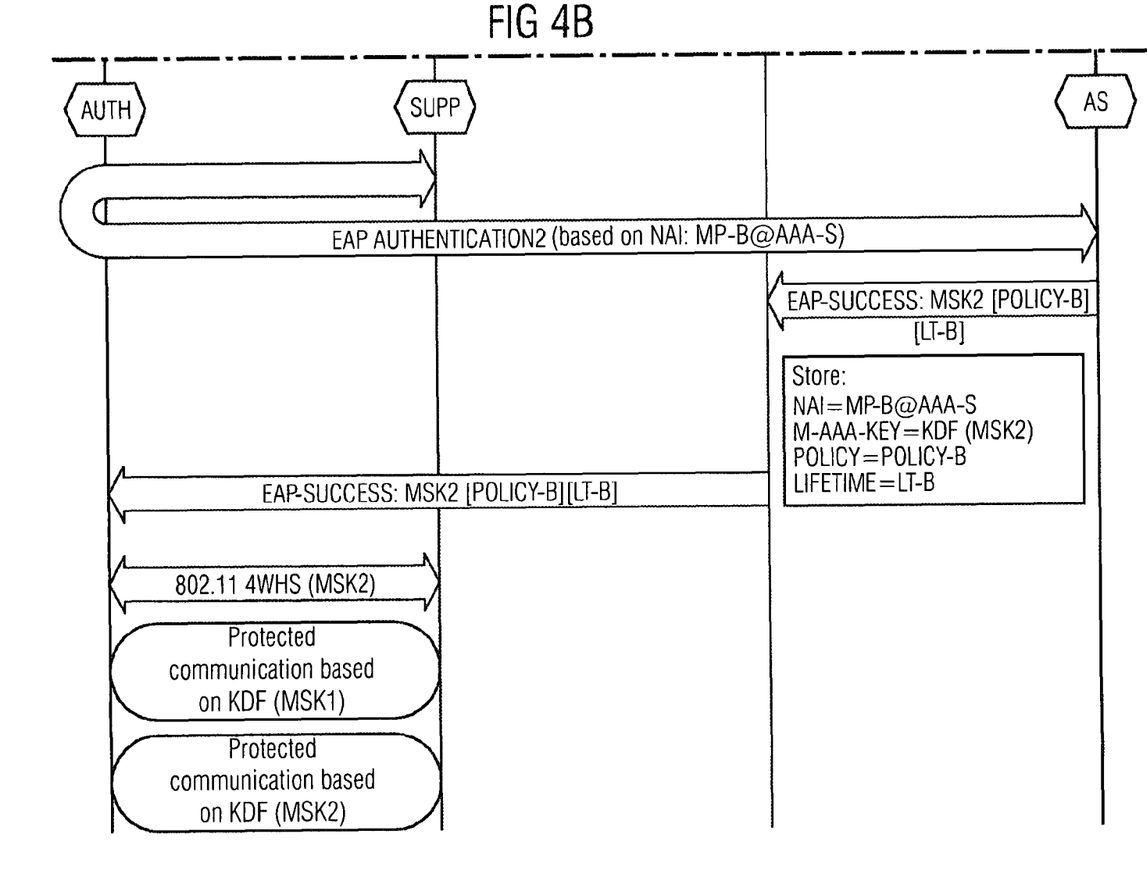
Figure 5:
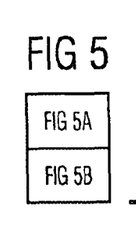
FIG. 5 shows a flow diagram of an authentication following the initial mesh registration.
Figure 5A:
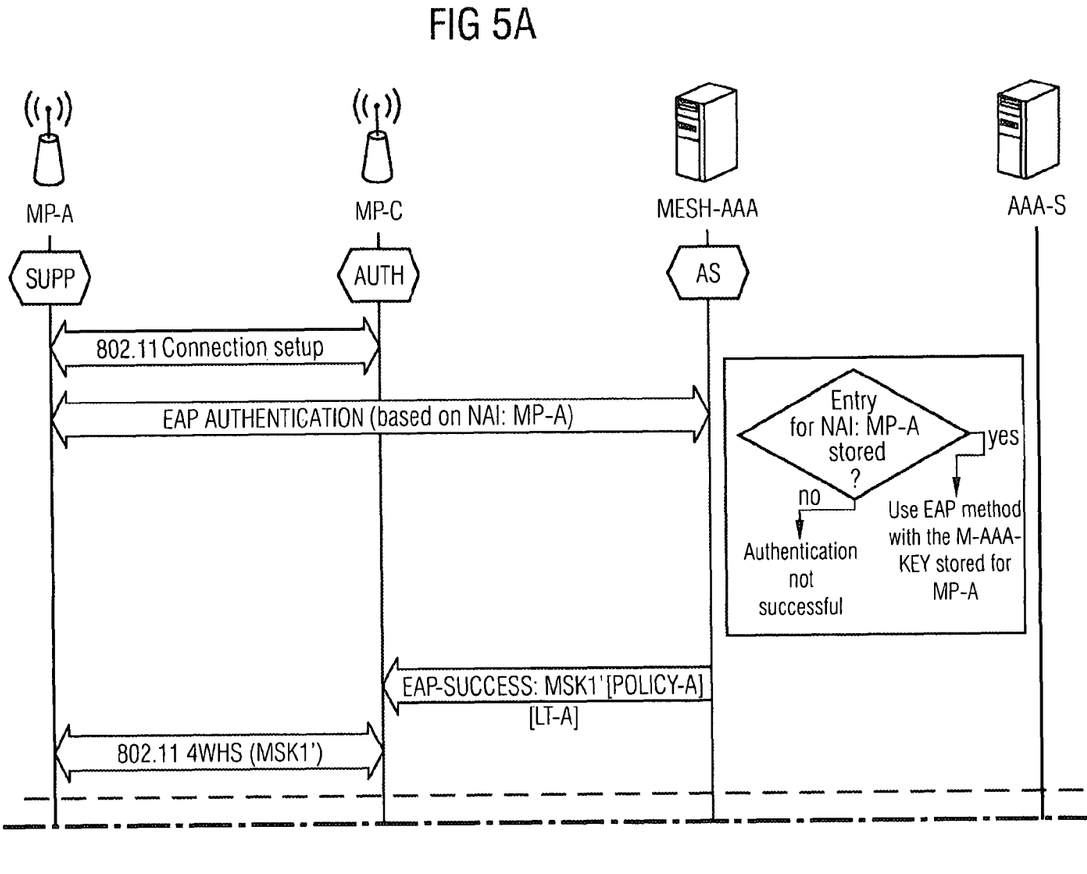
Figure 5B:
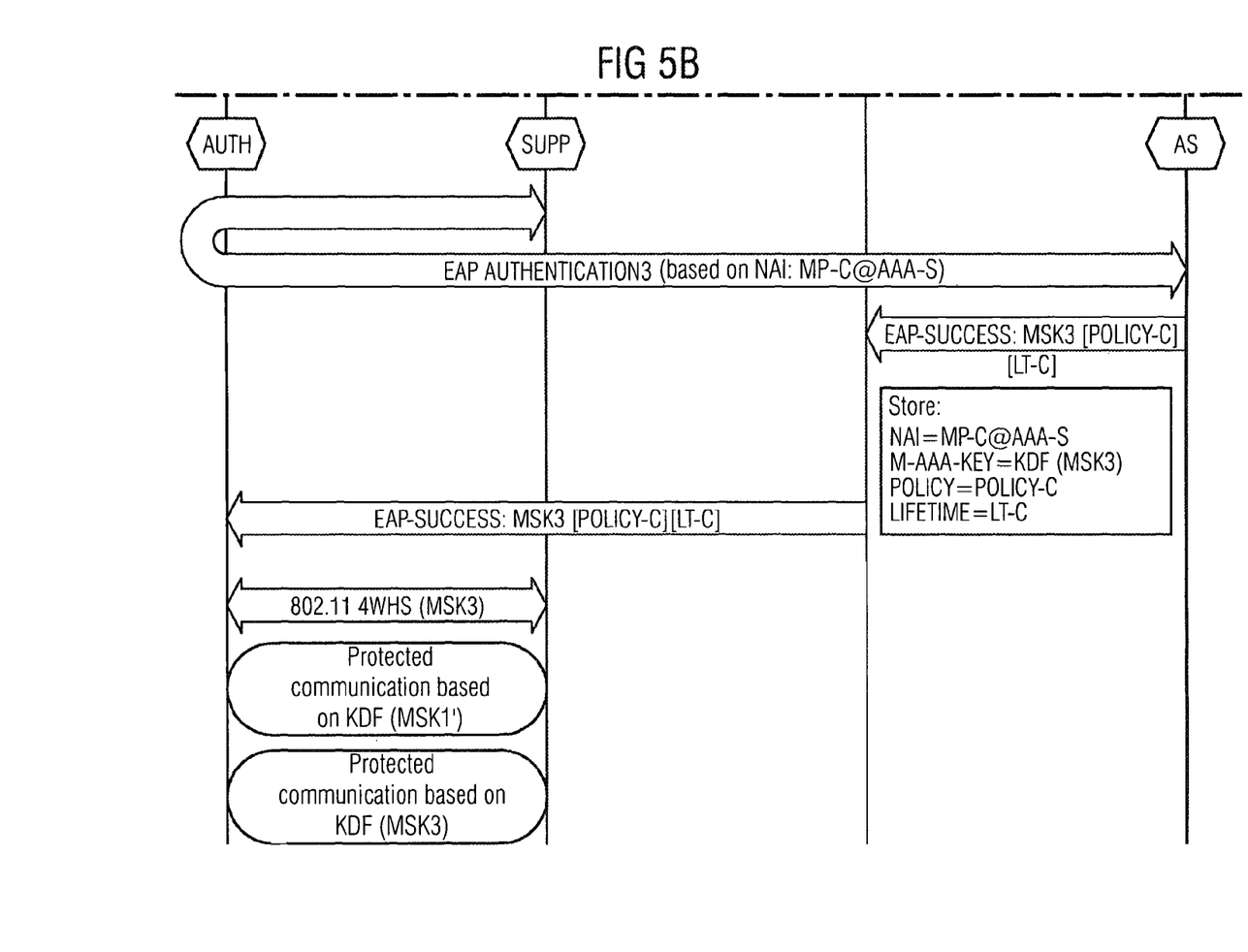
Figures 6, 6A:
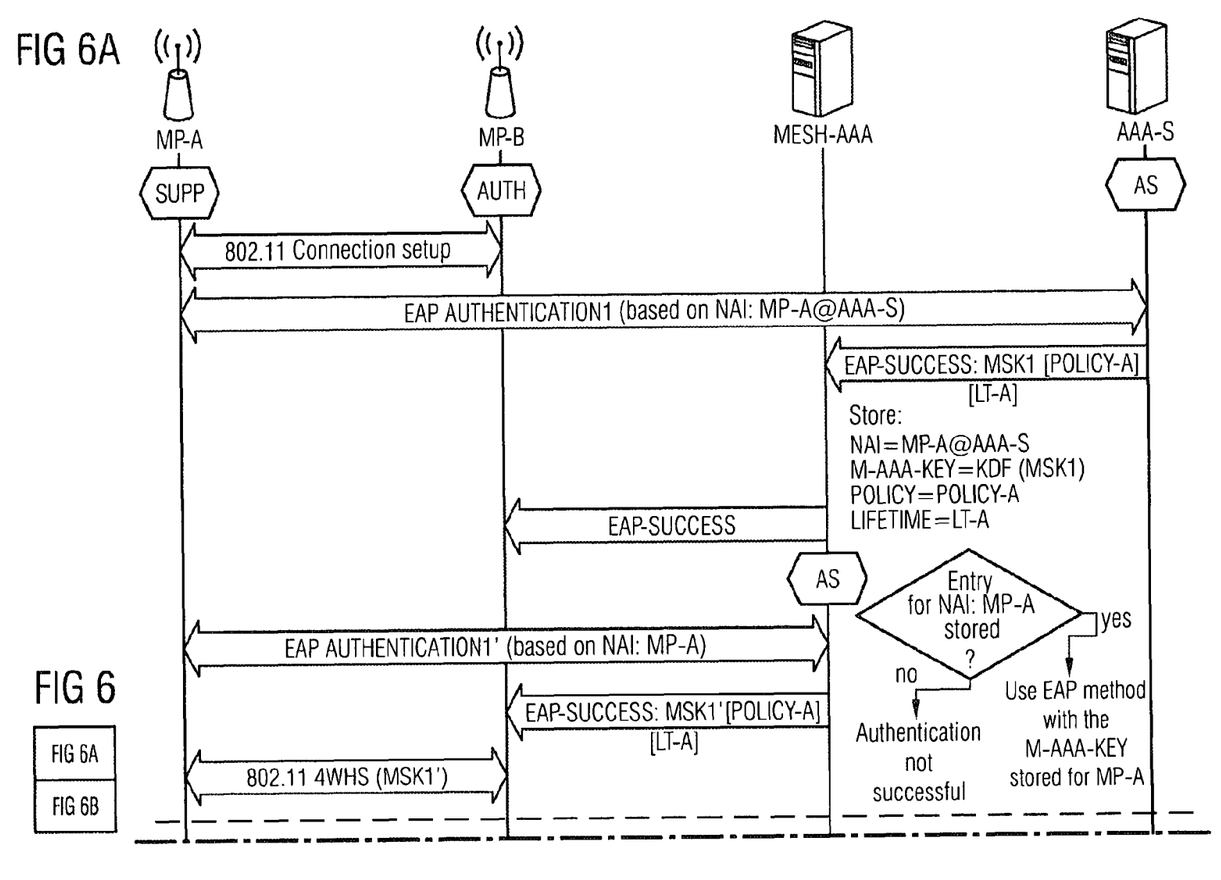
FIG. 6 shows a flow diagram of a second exemplary embodiment of the invention.
Figure 6B:
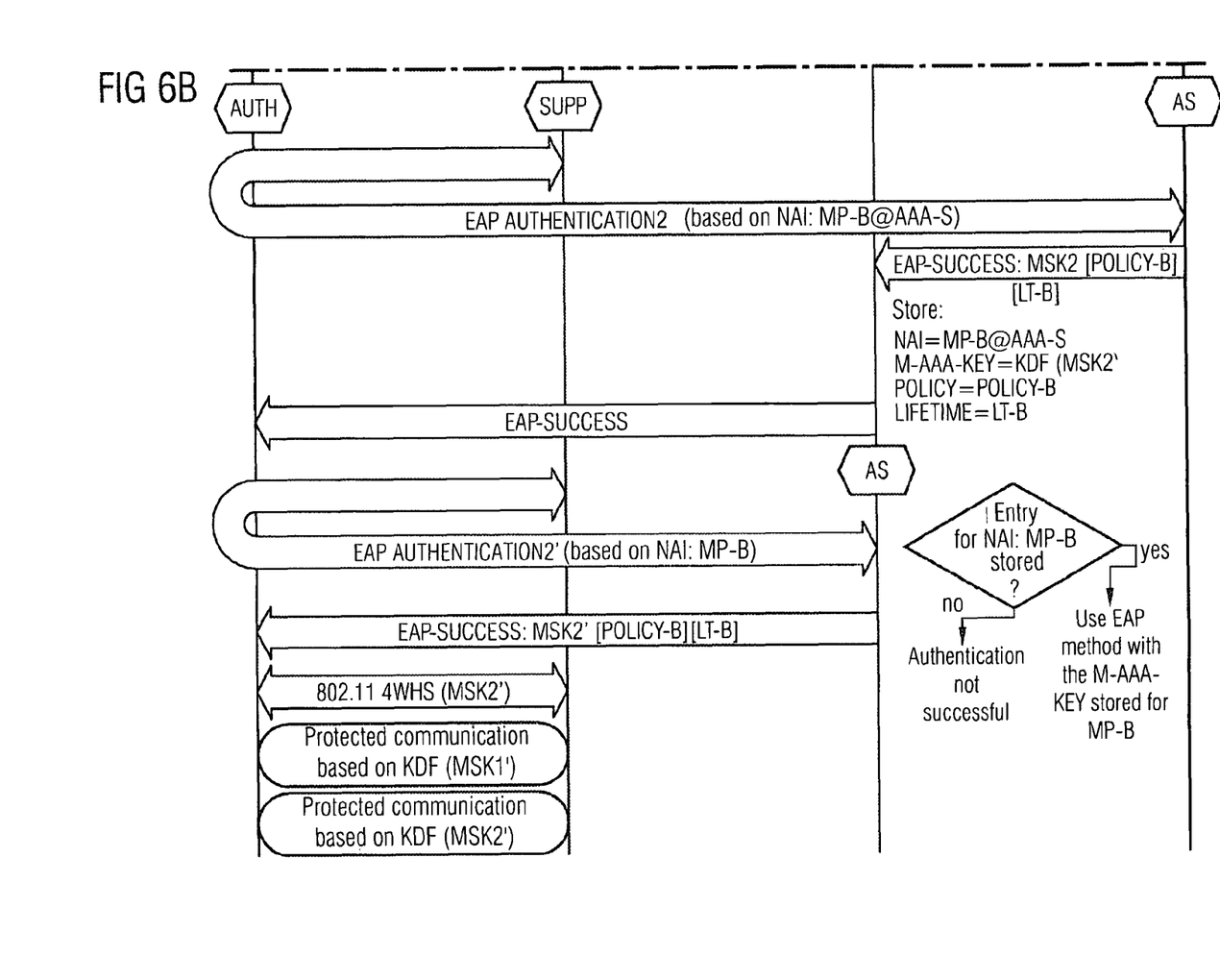

The core of the invention is that a new node or, as the case may be, a functionality implemented on the node designated by MESH-AAA in FIGS. 4 to 6 is operated as an intermediate AAA proxy which is connected between the mesh node and the AAA server.

Said new node MESH-AAA can be implemented e.g. on a mesh gateway node GW which connects the mesh network to an infrastructure network.

The method according to the invention now provides that in the case of a successful authentication of a first mesh node, i.e. of a first communication device MP-A, the new node, i.e. the station MESH-AAA stores a key received from the AAA server AAA-S or a key derived therefrom and moreover in such a way that the latter is assigned to the first communication device MP-A.

In FIG. 4 this key is designated as M-AAA-Key. Alternatively or in addition it is also provided according to the invention that if the AAA server AAA-S has parameters for operating a connection, i.e. what is referred to as a policy POLICY for the first communication device MP-A, this is likewise sent to the station MESH-AAA and is also stored assigned to the first communication device MP-A.

Further attributes or parameters POLICY which relate to the first communication device MP-A or the key M-AAA-KEY, such as, for example, the period of validity of the key LT or the user ID, are likewise stored assigned to the first communication device MP-A in the station MESH-AAA. In this case the period of validity of the key M-AAA-KEY is preferably identical to the period of validity of the session key MSK.

The first communication device MP-A also stores the key M-AAA-KEY which has been set up and transmitted to the station MESH-AAA, said key not having been transferred to the first communication device MP-A, but having been determined by the first communication device MP-A itself as the result of the known EAP authentication.

It is thus also provided according to the invention that the key M-AAA-KEY will be used for EAP registrations of the first communication device MP-A vis-à-vis further mesh nodes of the mesh network, an EAP method suitable for said secret key, e.g. the EAP-PSK method, preferably being used.

In said further registrations, the station MESH-AAA additionally operates as an AAA server, i.e. authentication attempts result in the station MBSH-AAA terminating the EAP protocol, the stored data such as the key M-AAA-KEY and the parameters POLICY being used for this purpose and the AAA server AAA-S of the infrastructure network INFRA-STRUCTURE NETWORK no longer being involved in said registrations.

The effect of this approach according to the invention is on the one hand that for a limited period of time which is determined for example according to the period of validity of the session key MSK, the tasks of the AAA server AAA-S are delegated to the station MESH-AAA for all AAA clients of the MESH mesh network.

Determining the mesh key M-AAA-KEY according to the invention can be implemented as follows. On the one hand it is possible to equate the key M-AAA-KEY with the session key MSK which results from the EAP authentication, or the mesh key M-AAA-KEY is determined from the session key MSK on the basis of a key derivation function KDF, it being possible for this to be accomplished by the AAA server AAA-S or by the station MESH-AAA. Finally it is also possible to have the key M-AAA-KEY calculated using the extended session key EMSK on the AAA server AAA-S on the basis of a key derivation function KDF. In this case cryptographic hash functions, such as e.g. SHA-1, MD5, SHA256, or keyed hash functions based thereon, such as e.g. HMAC according to RFC2104, are suitable in particular for the key derivation function KDF.

Suitable as an actual implementation for the key derivation function is, for example, $$M\text{-}AAA\text{-}KEY = HMAC\text{-}SHA\text{-}1 (MSK, \text{``Mesh-AAA-Key''}),$$

where the character string "Mesh-AAA-Key" explicitly specifies the intended purpose of the derived key M-AAA-KEY.

If the key derivation of the mesh key M-AAA-KEY is performed on the AAA server AAA-S, the AAA server AAA-S sends said derived key M-AAA-KEY as part of the EAP success message EAP-SUCCESS, whereas in the case in which the derivation is performed on the station MESH-AAA, or the mesh key M-AAA-KEY receives the value of the session key MSK, i.e. is therefore used without key derivation, no further key will be transmitted by the AAA server AAA-S. In this case the first-named option is advantageous from the security viewpoint, while the second appears simpler from the deployment viewpoint.

The identification information in accordance with the EAP network access identifier NAI generally has the format "user@realm" and is also inventively used in said format, i.e. the domain of the AAA server AAA-S is specified after the "@", whereas according to the invention in the following authentication attempts, i.e. using the stored key M-AAA-KEY due to the fact that the station MESH-AAA takes over the functionality of the AAA server AAA-S, this addresses.

The following advantageous implementation possibilities exist for this according to the invention:

An implicit in which the first communication device MP-A also uses the same NAI for subsequent registrations and the station MESH-AAA detects solely on the basis of the EAP protocol method used, such as, for example, EAP-PSK, that MESH-AAA, and not the AAA server AAA-S, is to process the EAP protocol.

It is also possible to reformat the original NAI, i.e. to insert a character string at any position of the usual NAI format, the designation of the station MESH-AAA, for example, being suitable for this, with the result that basically the following option presents itself for use as addresses "user{mesh-aaa}@realm", "{mesh-aaa}user@realm" or "user@{mesh-aaa}.realm".

In conclusion it is also possible to set the realm of the station MESH-AAA explicitly as the realm, such that NAI has the form "user@mesh-aaa".

The period of validity of the key M-AAA-KEY, i.e. its maximum lifespan or so-called key life time, is determined by the period of validity of the key M-AAA-KEY. If this has expired, no new EAP authentication can be performed therewith with the station MESH-AAA, with the result that an EAP registration of a client fails and said client must thereupon perform a new authentication with the AAA server AAA-S, as in the first step according to the invention, as a result of which a fresh key, whose period of validity has not yet expired, M-AAA-KEY is set up once again on the station MESH-AAA.

In this case said first communication device MP-A preferably performs the re-authentication with the AAA server AAA-S already some time before the expiry of the validity of the key M-AAA-KEY.

A variant to the use of secret keys such as the key M-AAA-KEY is that instead of the key M-AAA-KEY the AAA server AAA-S generates what are termed AKA authentication vectors AV and sends these to the station MESH-AAA, said AKA authentication vectors being used for further authentications by the first communication device MP-A within the mesh network MESH.

The method suitable therefor is the EAP method EAP-AKA (in accordance with RFC4187).

The essential difference between a key M-AAA-KEY and a set of AKA authentication vectors is that the key M-AAA-KEY can be used for any number of authentications within the validity period, whereas an AKA authentication vector can only be used for one authentication and thereafter is effectively spent.

According to the invention the session key MSK or EMSK of the first EAP registration is in this case to be used instead of the secret key which is otherwise set up permanently in the case of AKA between the "identity module" defined there and the "home environment" (cf. RFC4187, Section 1). In this case the first communication device MP-A does not necessarily use an identity module, such as, for example, a 3GPP SIM card or a USIM, but performs the corresponding operation itself and for that purpose uses the session key MSK or EMSK as the secret key. Similarly, the station MESH-AAA performs the operations of the home environment, i.e. the generation of the authentication vectors.

The sequence number required for the generation according to RFC4187, Section 1 is in this case reinitialized for each successful run with the AAA server AAA-S, with the value 0, for example. Since the AKA secret key is also redefined at the same time, security does not suffer, which means that overall the advantage of the variant prevails in the sense that within the validity period an indefinite number of authentications cannot be performed by the station MESH-AAA, but under the control of the AAA server AAA-S only as many authentications are performed as authentication vectors have been provided.

The essential advantages of the invention are due therein to the fact that only the first EAP authentication of a mesh node has to be carried out by the AAA server AAA-S, while further EAP runs are henceforth executed only using the station MESH-AAA.

Furthermore, owing to the use of the key M-AAA-KEY for the subsequent EAP runs, a very efficient secret-key-based authentication is performed by means of the method according to the invention, while the AAA server AAA-S can use any EAP methods, including for example those that require compute-intensive certification checks or public key operations, such as, for example, EAP-TLS or PEAP. As a result the AAA server AAA-S is not occupied or subject to load by constant authentication attempts and consequently can be configured as a less powerful system.

FIG. 4 shows the sequence of the first-time registration in accordance with the inventive method with the aid of a flow diagram.

It can be seen therein that a connection setup in accordance with the IEEE 802.11 standard is initiated by a first communication device MP-A, which, in the registration shown, assumes the role of the supplicant SUPP, and a communication device MP-B, which assumes the role of an authenticator AUTH. In a next step this initiates a known first EAP authentication EAP AUTHENTICATION1 according to the prior art. During the latter the first communication device MP-A communicates with an AAA server AAA-S which, following successful EAP authentication, transmits an EAP success message EAP-SUCCESS with a first session key MSK1 as well as parameters or attributes of the connection POLICY-A, LT-A to a station according to the invention MESH-AAA. The latter then stores the NAI for the first communication device MP-A, a key M-AAA-KEY, which has been determined from the session key MSK1 by means of a key derivation function KDF, the parameters and the attributes POLICY-A, LT-A as the data record assigned to the first communication device MP-A and sends or forwards the EAP success message EAP-SUCCESS to the station MP-B assuming the authenticator role, with the result that subsequently the EAP run is brought to completion in the known handshake methods. Thereafter, as is known from the prior art, the roles of the authenticator and the supplicant SUPP are then reversed and a new EAP run EAP AUTHENTICATION2 is executed on the basis of the NAI known according to the prior art, with the result that a session key as well as parameters and attributes are likewise transmitted from the AAA server AAA-S to the station MESH-AAA for the station MP-B, which is now being operated in the role of the first communication device according to the invention, such that in an analogous manner to the first communication device MP-A a data record assigned to the station MP-B is stored and the EAP run for the station MP-B is terminated, such that a protected communication can take place between the first communication device MP-A and the second communication device MP-B on the basis of the first session key MSK1 or of the second session key MSK2.

In summary it should therefore be remembered that in the core the method according to the invention begins such that initially no entry is present on the station MESH-AAA either for the first communication device MP-A or for the second station MP-B and the first authentication is performed therein as already known based on the prior art, with the difference that according to the invention, upon successful authentication, the station MESH-AAA creates a corresponding entry for the respective communication device (mesh node), the latter containing the respective mesh node's identification information NAI used for the registration, the key M-AAA-KEY assigned to the respective mesh node, as well as further assigned data provided by the AAA server AAA-S, such as, for example, the policy POLICY-A . . . POLICY-C, lifetime LT-A . . . LT-C and further attributes, if any.

Following the authentication, a data record has been created in each case for the first communication device MP-A and the second communication device MP-B on the station MESH-AAA, which data record will be used for further authentications. Thus, according to the inventive method, both stations take on the role of the first communication device once.

For the authentications following the first authentication that was successful the first time, the sequence as in the example shown in FIG. 5 is presented as follows:

If a subsequent authentication now occurs with a first communication device MP-A vis-à-vis a third communication device MP-C, then the EAP protocol terminates in the station MESH-AAA, for example because the station detects that the EAP method EAP-PSK is being used or, as illustrated, because the subsequent authentication EAP AUTHENTICATION 1' is performed on the basis of a modified NAI MP-A, with the result that, if a suitable entry for said NAI can be found in the station MESH-AAA, the EAP method is performed on the basis of the key M-AAA-KEY stored for said first communication device MP-A and otherwise the authentication is aborted without success.

It can also be seen that in the case of success, an EAP success message EAP-SUCCESS with a session key MSK' as well as parameters and attributes POLICY-A, LT-A will be sent by the station MESH-AAA, as would be effected by the AAA server AAA-S according to the prior art, to the third communication device MP-C, so that finally said key, which is generated as a derivation of the key M-AAA-KEY, will be used in the 4-way handshake.

It can also be seen that in the run in which the third communication device MP-C now acts as supplicant SUPP, an authentication as performed according to the prior art is carried out, since for the third communication device MP-C this is the first authentication in the mesh network and according to the invention this again leads to a key M-AAA-KEY assigned to the third communication device MP-C as well as parameters and attributes POLICY-C, LT-C being stored. A protected communication thereupon takes place between the first communication device MP-A and the third communication device MP-C firstly on the basis of the first key according to the invention MSK1' and of the session key for the third communication device MSK3.

FIG. 6 now shows a variant of the initial registration according to the invention.

In this variant, the authentication with the aid of the AAA server AAA-S serves merely to create an entry on the station MESH-AAA. This is followed by a further EAP authentication using the data record that has been set up.

This means that all in all, at the time of the first registration of a first communication device MP-A, two EAP runs take place with the first communication device MP-A in the supplicant role SUPP, one run being executed with the AAA server AAA-S as authentication server and one run with the station MESH-AAA in the aforesaid role.

Figures 7, 7A:
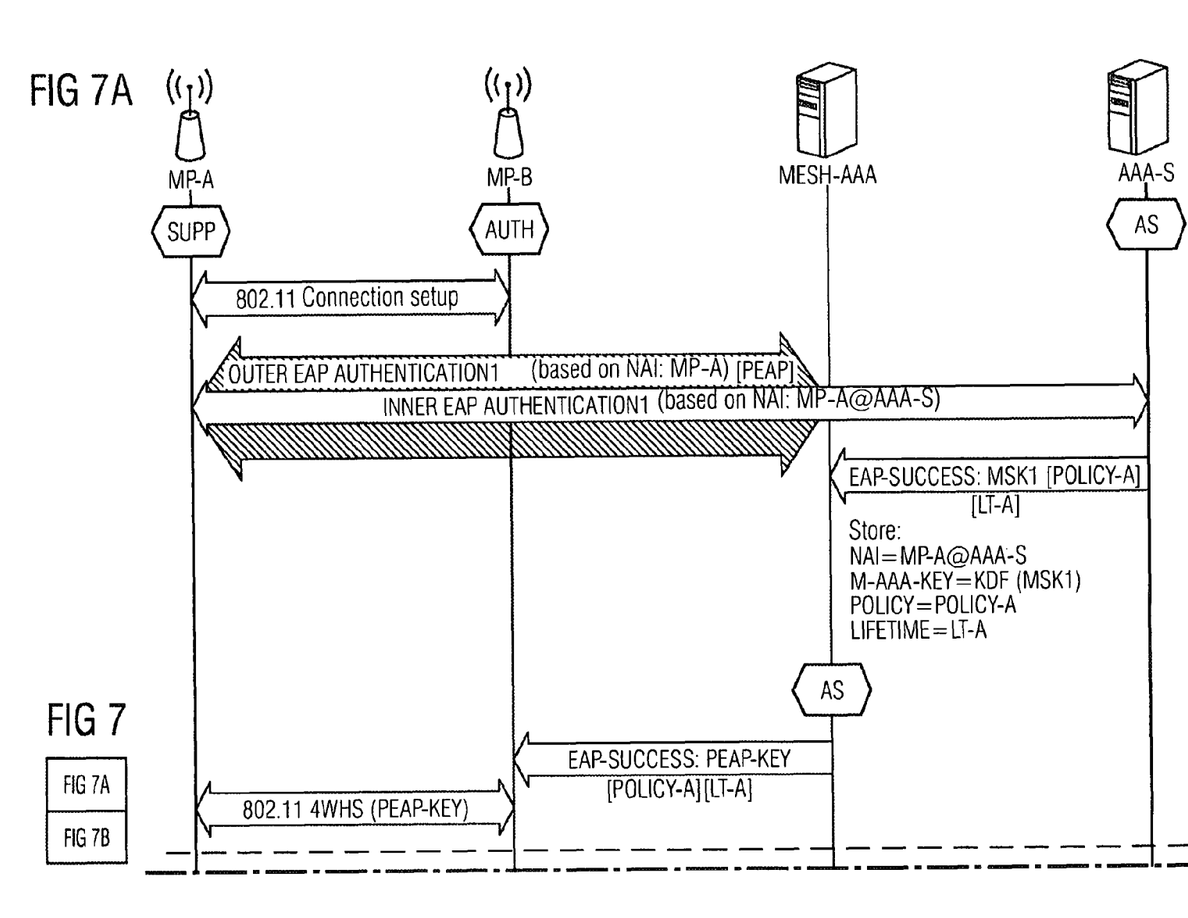
FIG. 7 shows a flow diagram of a third exemplary embodiment of the invention.
Figure 7B:
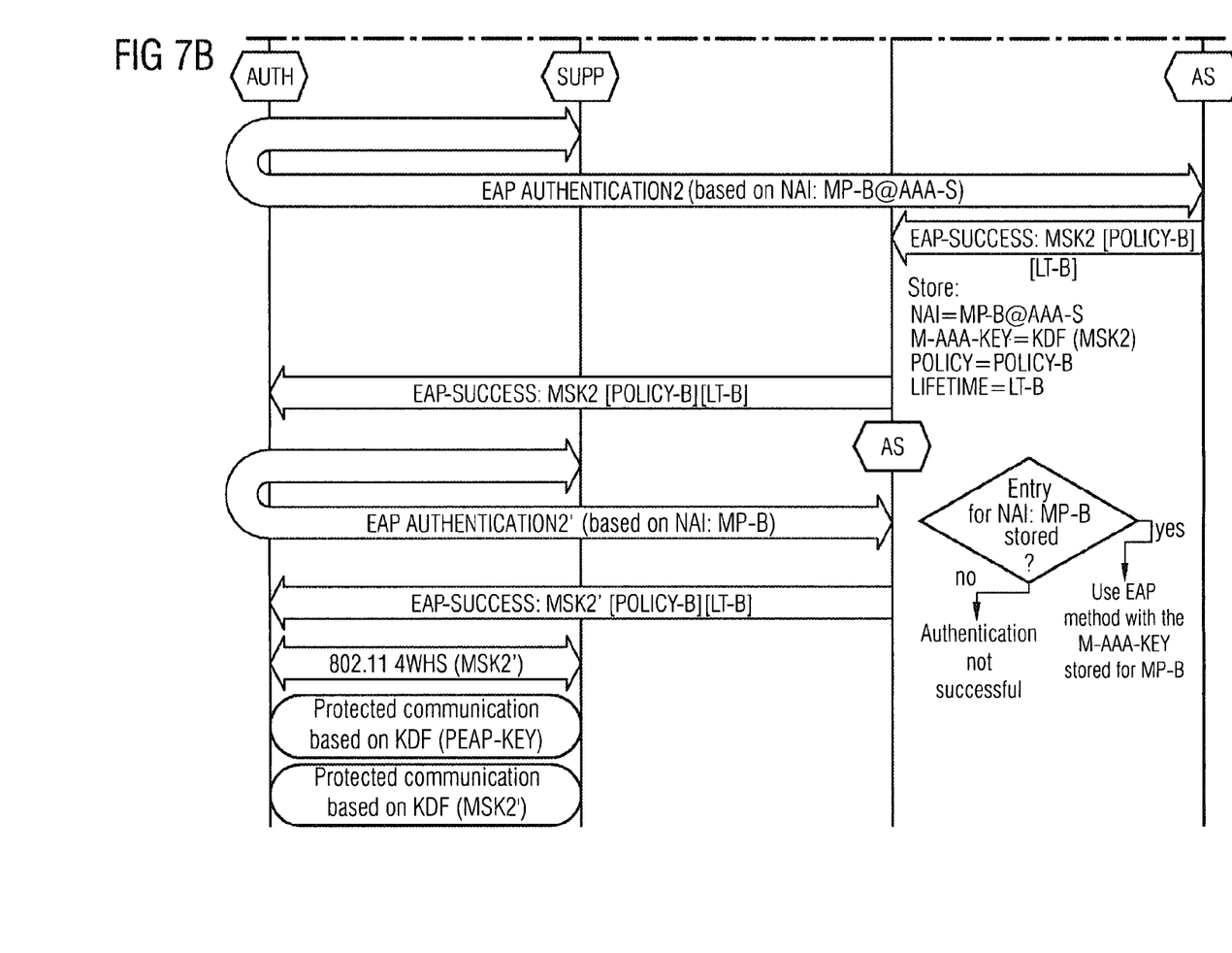

A further variant of the initial registration is shown in FIG. 7.

This variant consists in the use of what is referred to as a tunneled EAP method, as provided for example by EAP-PEAP, instead of two separate EAP runs.

With this method the tunnel endpoint of the outer method is in this case the station MESH-AAA and the endpoint of the inner EAP method is the AAA server AAA-S.

Furthermore, the PEAP key is derived in accordance with the PEAP specification, with the inventive difference that a session key MSK set up by the inner EAP method is used to derive the key M-AAA-KEY.

The use of PEAP with what is termed "early termination", by which is meant that the inner and outer EAP methods terminate at different nodes, is described in the Intel White Paper titled "Public WLAN Interworking Study", 2004, Section 3.2.7.

The invention claimed is:

1. A method for providing a wireless local area network, having stationary communication devices and mobile communication devices embodied according to the IEEE 802.11 standard and its derivatives and belonging to a mesh subnetwork which is connected to an infrastructure network in such a way that it can exchange authentication messages via a station assigned to the subnetwork with an Authentication, Authorization, Accounting (AAA) server disposed in the infrastructure network using the Extensible Authentication Protocol (EAP) protocol comprising:

the AAA server:
generating basic encryption information valid for the subnetwork precisely once within a first validity period, the generating being performed after a successful first-time authentication of a first communication device of the subnetwork with specification of first identity information vis-à-vis a communication device of the subnetwork fulfilling a role of an authenticator defined in accordance with the EAP protocol, and transmitting the basic encryption information to a station that is uniquely assignable to the subnetwork; and the station assigned to the subnetwork:
storing the basic encryption information,
assigning the basic encryption to the first identity information specified by the first communication device; and
handling subsequent authentication attempts of the first communication device vis-à-vis a second communication device of the subnetwork with specification of second identity information in the manner of a proxy server while omitting the AAA server on the basis of the basic encryption information determined from the specified identity information using the EAP protocol; and a station of the second communication device:
providing a key determined for the second communication device using the stored basic encryption information for the purpose of cryptographically secure communication with the first communication device.

2. The method as claimed in claim 1, wherein the basic encryption information includes an encryption key.

3. The method as claimed in claim 2, wherein the station assigned to the subnetwork stores the encryption key as a key assigned to the first communication device.

4. The method as claimed in claim 3, wherein the stored encryption key is used for handling the subsequent authentication attempts.

5. The method as claimed in claim 2, wherein the station assigned to the subnetwork derives a key from the encryption key and stores it as a key assigned to the first communication device.

6. The method as claimed in claim 2, wherein the AAA server derives a key from the encryption key and stores it as a key assigned to the first communication device and transmits it as part of the basic encryption information in the course of the first-time authentication.

7. The method as claimed in claim 2, wherein an assigned key is transmitted with a message embodied as an EAP success message in accordance with the EAP protocol.

8. The method as claimed in claim 5, wherein the derivation is performed in such a way that the assigned key is generated using a key derivation function on the basis of a master session key formed in accordance with the EAP protocol, or the derivation is performed in such a way that the assigned key is generated using a key derivation function on the basis of an extended master session key formed in accordance with the EAP protocol.

9. The method as claimed in claim 5, wherein the derivation is performed by the AAA server.

10. The method as claimed in claim 5, wherein the derivation is performed by the station assigned to the subnetwork.

11. The method as claimed in claim 8, wherein a function conforming to a cryptographic hash function according to SHA-1, SHA256 or MD5 is used as the key derivation function of the assigned key.

12. The method as claimed in claim 8, wherein the key derivation function of the assigned key is based on keyed hash functions according to HMAC.

13. The method as claimed in claim 8, wherein the assigned key is formed in accordance with the following formula based on key derivation functions M-AAA-KEY=HMAC-SHA1(MSK, Mesh-AAA-Key), wherein M-AAA-KEY denotes the assigned key, wherein HMAC-SHA1 denotes a keyed hash function HMAC using the hash function SHA-1, wherein MSK denotes the master session key determined in accordance with the EAP protocol, and wherein Mesh-AAA-Key denotes a character string which in particular expresses an intended purpose of the key.

14. The method as claimed in claim 8, wherein the derivation is performed in such a way that the assigned key is identical to the master session key or extended master session key formed in accordance with the EAP protocol.

15. The method as claimed in claim 8, wherein that the first validity period corresponds to a period of validity of the master session key and/or the extended master session key formed in accordance with the EAP protocol.

16. The method as claimed in claim 8, wherein a second validity period determining a period of validity of the assigned key corresponds to a period of validity of a master session key formed in accordance with the EAP protocol.

17. The method as claimed in claim 1, wherein a second validity period determining a period of validity of the assigned key is determined by a specified number of allowed authentications.

18. The method as claimed in claim 1, wherein a converter connecting the subnetwork to the infrastructure network is used as a station.

19. The method as claimed in claim 1, wherein parameters determining policy network attributes are appended to the basic encryption information.

20. The method as claimed in claim 1, wherein authentications following the first authentication are performed based on a EAP-PSK method specified according to the EAP protocol.

21. The method as claimed in claim 1, wherein the handling in the manner of a proxy server is performed in such a way that after the first-time authentication has been completed, the AAA server is omitted by terminating messages formed in accordance with the EAP protocol in the station assigned to the subnetwork, the termination being performed based on information correlating with the messages.

22. The method as claimed in claim 1, wherein a type of the EAP protocol method used is detected as correlating information.

23. The method as claimed in claim 21, wherein the identity information has the form user@realm; and wherein user designates a message-sending station; and wherein realm designates a domain provided in particular by the AAA server is manipulated as correlating information in such a way that the message-sending station is yielded as addressee from the information correlating with the messages.

24. The method as claimed in claim 1, wherein after expiration of the first validity period further authentications are only successful following a new first-time authentication with the AAA server performed in particular before the expiration of the first validity period.

25. The method as claimed in claim 1, wherein the basic encryption information includes as information at least one AKA authentication vector formed in the manner of that formed according to RFC4187 Section 1.

* * * * *